Sept. 22, 1931.  I. W. NOYES  1,824,744

LUBRICATED ROLL BEARING

Filed March 15, 1930

Inventor.
Ira W. Noyes
by Heard Smith & Tennant.
Attys.

Patented Sept. 22, 1931

1,824,744

UNITED STATES PATENT OFFICE

IRA W. NOYES, OF HOPEDALE, MASSACHUSETTS, ASSIGNOR TO DRAPER CORPORATION, OF HOPEDALE, MASSACHUSETTS, A CORPORATION OF MAINE

LUBRICATED ROLL BEARING

Application filed March 15, 1930. Serial No. 436,025.

This invention relates to a lubricated roll bearing and, while particularly designed for the bearing of the roll in the treadle of a loom harness motion, is applicable to other situations where similar conditions prevail.

The object of the invention is to provide a simple and efficient construction for maintaining a constant and thorough lubrication of the bearing surface of the roll.

These and other objects and features of the invention will appear more fully from the accompanying description and drawings and will be particularly pointed out in the claims.

The drawings illustrate a portion of a cam harness motion of a loom, together with a preferred form of the invention embodied therein.

Figure 1:
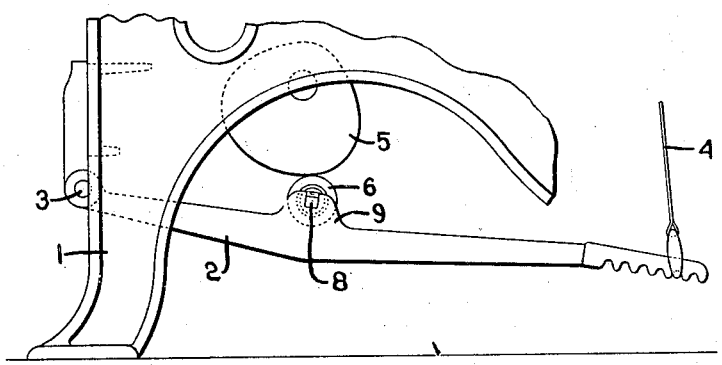
Fig. 1 is a side elevation of the lower portion of a loom having a cam harness motion, together with a preferred form of the invention embodied therein.
Figure 2:
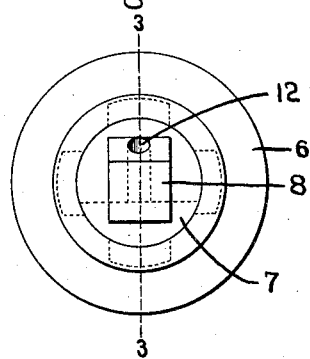
Fig. 2 is an end elevation of the treadle roll and journal pin.
Figure 3:
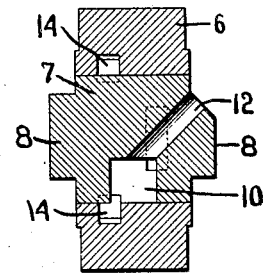
Fig. 3 is a view in vertical cross section on the line 3—3 of Fig. 2.

The invention is shown embodied in the treadle roll and journal pin of an ordinary type of loom cam harness motion. A portion of the loom frame 1 is shown with one of the harness treadles 2 journalled at 3 therein and with the portion of the connection 4 extending up from the treadle to connect with the harness frame and with the cam 5 for operating the treadle. In this type of construction each treadle carries a roll 6 cooperating with the cam 5 and the invention is here embodied in connection with this treadle roll.

A journal pin 7 is non-rotatably mounted in the treadle 2 and for this purpose is usually provided with polygonal ends 8, herein shown as of square cross section seated in recesses of a corresponding shape in the upwardly extending flanges 9 of the treadle.

In this invention the journal pin 7 is provided at its end portion with a central, and preferably segmental, recess 10. This pin recess 10 is of comparatively large size, its outer surface extending over a long arc of the pin and throughout considerable width of the pin. The development of this surface is shown in dotted lines at 11 in Fig. 4. A feed opening 12 extends from the pin recess 10 upward out through one end of the pin and, as shown, out through the upper surface of one of the polygonal ends 8.

Figure 4:
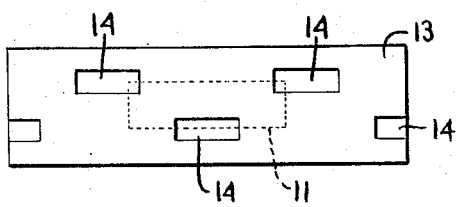
Fig. 4 is a development of the bearing surface of the roll.

The bearing surface of the roll 6 is shown developed at 13 in Fig. 4. The roll is provided in its bearing surface with a plurality of recesses 14. These recesses are so arranged that each overlaps the pin recess 10 at each rotation of the roll and preferably so that at least two of these roll recesses overlap the pin recess at all times during the rotation of the roll. Preferably the recesses are arranged in two separated and staggered circumferential rows. Preferably also each recess is of a less length and of a less width than the length and width of the pin recess, but the roll recesses extend over a greater width of the bearing surface than the width of the pin recess.

It will thus be seen that when lubricant is fed into the feed opening 12 and fills the pin recess 10, it forms therein a reservoir from which it is distributed during the rotation of the roll to the various roll recesses 14 and it will also be seen that this lubricant is distributed from all the recesses, both the pin recess 10 and the roll recesses 14, throughout the bearing surfaces between the pin and the roll, thus maintaining at all times a thorough lubrication of the bearing surface.

The pin recess 10 being in the under portion of the journal pin, the entire upper bearing surface of the journal pin which carries the load is smooth and unbroken and this is where the greatest wear occurs.

There is thus presented a simple and efficient construction of a lubricated pin and roll bearing which acts to maintain the bearing surfaces between the pin and the roll thoroughly lubricated. While the support for the pin is disclosed as the treadle of a loom harness motion and the invention is particularly applicable to such a construction, it will be understood that the invention is also applicable to other forms of support where similar conditions occur.

Having thus described the invention, what is claimed as new, and desired to be secured by Letters Patent, is:

1. A bearing structure comprising a support, a journal pin non-rotatably mounted in the support and having a central recess in its under portion with a feed opening extending therefrom upward out through one end of the pin, and a roll journalled on the pin and having recesses in its bearing surface arranged in circumferential rows with each recess at each rotation of the roll overlapping the pin recess, whereby lubricant supplied through the feed opening forms a reservoir in the pin recess and is distributed therefrom to the roll recesses and from all the recesses to the bearing surfaces.

2. A bearing structure comprising a support, a journal pin non-rotatably mounted in the support and having a central segmental recess in its under portion with a feed opening extending upward therefrom out through one end of the pin, a roll journalled on the pin and having recesses in its bearing surface each of less length and width than the length and width of the pin recess and staggered over a greater width of the bearing surface than the width of the pin recess and each roll recess at each rotation overlapping the pin recess, whereby lubricant supplied through the feed opening forms a reservoir in the pin recess and is distributed therefrom to the roll recesses and from all the recesses to the bearing surfaces.

3. A bearing structure comprising a support, a journal pin non-rotatably mounted in the support and having a central segmental recess in its under portion with a feed opening extending upward therefrom out through one end of the pin, a roll journalled on the pin and having recesses in its bearing surface each of less length and width than the length and width of the pin recess and staggered over a greater width of the bearing surface than the width of the pin recess and at least two of the roll recesses overlapping the recess in the pin at all times during the rotation of the roll, whereby lubricant supplied through the feed opening forms a reservoir in the pin recess and is distributed therefrom to the roll recesses and from all the recesses to the bearing surfaces.

4. A bearing structure comprising a support, a journal pin having polygonal ends seated in the support and having a central segmental recess in its under portion with a feed opening extending therefrom upward out through one of the polygonal ends, and a roll journalled on the pin having recesses in its bearing surface each of less area than that of the pin recess and staggered over a greater width of the bearing surface than the width of the pin recess with at least two of the roll recesses overlapping the pin recess at all times during the rotation of the roll, whereby lubricant supplied through the feed opening forms a reservoir in the pin recess and is distributed therefrom to the roll recesses and from all the recesses to the bearing surfaces.

In testimony whereof, I have signed my name to this specification.

IRA W. NOYES.